US012600282B2

(12) United States Patent
Demleitner et al.

(10) Patent No.: US 12,600,282 B2
(45) Date of Patent: Apr. 14, 2026

(54) VEHICLE SEAT WITH AUTOMATIC SEAT PART INCLINATION COMPENSATION

(71) Applicant: GRAMMER Aktiengesellschaft, Ursensollen (DE)

(72) Inventors: Berthold Demleitner, Freudenberg (DE); Thomas Haller, Ursensollen (DE)

(73) Assignee: GRAMMER AKTIENGESELLSCHAFT, Ursensollen (DE)

( * ) Notice: Subject to any disclaimer, the term of this patent is extended or adjusted under 35 U.S.C. 154(b) by 0 days.

(21) Appl. No.: 18/823,949

(22) Filed: Sep. 4, 2024

(65) Prior Publication Data

US 2025/0083582 A1      Mar. 13, 2025

(30) Foreign Application Priority Data

Sep. 13, 2023    (DE) ..................... 10 2023 124 757.3

(51) Int. Cl.
  *B60N 2/90*        (2018.01)
  *B60N 2/02*        (2006.01)
(52) U.S. Cl.
  CPC ............. *B60N 2/914* (2018.02); *B60N 2/026* (2023.08)
(58) Field of Classification Search
  CPC ......... B60N 2/914; B60N 2/026; B60N 2/39; B60N 2/58; B60N 2/10; B60N 2/0224; B60N 2/0272
  See application file for complete search history.

(56) References Cited

U.S. PATENT DOCUMENTS 4,174,088 A * 11/1979 Schaefer .............. B60N 2/0875
                                                      248/420
2011/0062690 A1* 3/2011 Kizaki .................. B60R 21/207
                                                      280/743.1
(Continued)

FOREIGN PATENT DOCUMENTS

DE          10317356       6/2004
DE        102012109597     4/2014
(Continued)

OTHER PUBLICATIONS

Nakajima Masayoshi et al., Jan. 11, 2007 English Machine Translation_ JP 2007001371 A provided by Patent Translate by EPO and Google (Year: 2007).*

(Continued)

Primary Examiner — Ashley L Redhead, Jr.
(74) Attorney, Agent, or Firm — Sheridan Ross P.C.

(57) ABSTRACT

The invention relates to a vehicle seat for automatic inclination compensation, with a seat part that has a seat cushion part, wherein a fluid chamber unit with at least two flexibly designed fluid chambers is arranged in the seat cushion part in its upper seating area, wherein, in relation to a centre axis extending in the seating direction, a first half of the fluid chambers are arranged on the left-hand side and a second half of the fluid chambers are arranged on the right-hand side of the centre axis, wherein the fluid chambers of the first and second halves can be filled or emptied by means of a control device depending on a detected lateral tilted position of the seat part in such a way that a seat user automatically experiences a compensatory position to the tilted position in the seat area.

11 Claims, 5 Drawing Sheets

(56) References Cited

U.S. PATENT DOCUMENTS

| 2012/0223554 A1 * | 9/2012 | Lem ........................ B60N 2/976 |
| | | 297/284.3 |
| 2015/0061312 A1 * | 3/2015 | Ishige .................... B62J 45/413 |
| | | 296/65.01 |
| 2019/0092197 A1 * | 3/2019 | Arata ........................ B60N 2/22 |
| 2025/0083582 A1 * | 3/2025 | Demleitner ............ B60N 2/026 |

FOREIGN PATENT DOCUMENTS

| DE | 102018128505 | | 5/2019 | |
| DE | 112020000105 | | 7/2021 | |
| DE | 112020000105 T5 * | | 7/2021 | ............. B60N 2/914 |
| JP | 2007001371 A * | | 1/2007 | |
| JP | 2017-132364 | | 8/2017 | |
| JP | 2017132364 A * | | 8/2017 | ........... B60N 2/0268 |

OTHER PUBLICATIONS

Kato Yasuyuki et al., Jan. 28, 2016 English Machine Translation_JP 2017132364 A provided by Patent Translate by EPO and Google (Year: 2016).*

Zhang Haitao, Nov. 13, 2019 English Machine Translation_DE112020000105 T5 provided by Patent Translate by EPO and Google (Year: 2019).*

Extended European Search Report for Europe Patent Application No. 24197926.9, dated Jan. 24, 2025, 22 pages.

Official Action for Germany Patent Application No. 102023124757.3, dated Apr. 16, 2024, 4 pages.

* cited by examiner

VEHICLE SEAT WITH AUTOMATIC SEAT PART INCLINATION COMPENSATION

CROSS REFERENCE TO RELATED APPLICATION

This application claims the benefit of German Patent Application No. 10 2023 124 757.3, filed Sep. 13, 2023, the entire contents of which are hereby incorporated herein by reference.

FIELD

The invention relates to a vehicle seat for the automatic inclination compensation with a seat part and a backrest part.

BACKGROUND

With commercial vehicles, such as tractors, there is often the problem that they are operated at times in a sideways or inclined position, for example to pull a plough behind them on the field. When ploughing the field, the problem arises that one half of the tractor's wheels is in the area of the already ploughed field, while the other half of the wheels is moving on the un-ploughed soil. This results in a sideways inclined position or slanted position of the tractor and thus also of the vehicle seat.

If a vehicle seat is slanted or in an inclined position for a long period of time, this can put strain on the back and spine of the vehicle user, resulting in the risk of spinal damage in the working environment of tractors and construction machinery. In the case of construction machinery, the problem also arises very often that these machines have to be operated in a slanted position during road construction work. This also means that the seat user sits in a slanted position on the vehicle seat and tries to compensate for this slanted position with the help of his or her spine.

This results in a misalignment of the spine from top to bottom in relation to the position of the pelvis. Under certain circumstances, this can even lead to curvature of the spine, known as scoliosis. This is because the human body tends to want to keep its head and therefore its eyes horizontal, even if the pelvis at the end of the spine is tilted.

Scoliosis is classified as mild if the angle of curvature of the spine is more than 10° but not more than 40°. Very often, such values are around 20°. Although scoliosis of this kind can be treated by consistent back exercises, such exercises must be carried out consistently and regularly, which is often not possible due to the daily work environment on the field or on the construction site.

SUMMARY

The invention is therefore intended to provide a vehicle seat with an automatic inclination compensation system and a seat part that can easily provide the seat user with a compensatory position when the vehicle seat is in an inclined or slanted position.

The core idea of the invention is that so-called fluid chambers are used in the area of the seat part of a vehicle seat for automatic inclination compensation with a seat part and a backrest, whereby the seat part and backrest are to be considered independently of each other. This means that only the seat part and not the backrest part is changed for a compensating movement.

For this purpose, the vehicle seat with the seat part, which has a seat cushion part, has a fluid chamber unit with at least two flexibly designed fluid chambers in the seat cushion part, wherein this fluid chamber unit is arranged exclusively in the upper seat area of the seat cushion part. The plurality of fluid chambers is divided into two halves in relation to a centre axis extending in the direction of the seat. A first half, which corresponds to half of the total fluid chambers or their fluid chamber volume in terms of both volume and number, is arranged to the left of the centre axis. In a second half in relation to the number and volume of the total fluid chambers, the remaining fluid chambers are arranged to the right of the centre axis.

The fluid chambers of the first and second half can be filled and/or emptied by means of a control device, depending on a detected lateral inclination of the seat part, in such a way that a seat user automatically experiences a compensatory position in the seat area in the lateral direction to the inclination of the vehicle.

For this purpose, an inclination sensor unit is preferably used, which is connected to the vehicle seat, whereby this measures the degree of the current lateral inclination of the vehicle seat and/or the vehicle and sends an inclination measurement signal to the control device. The data received from the inclination measurement signal is processed within the control device, after which a valve device receives signals from the control device in order to inflate either the left-hand fluid chamber or the right-hand fluid chamber with a fluid.

This means that the fluid chamber on the side to which the vehicle and vehicle seat are leaning can be inflated or pumped up in a targeted manner, thus achieving a compensatory position opposite to the tilted position of the entire vehicle seat and vehicle. This realigns the pelvis and thus the seat user's buttocks horizontally, without moving the backrest. The aim is to ensure that the spine is aligned straight, even when the vehicle is leaning extremely to one side. This is to prevent scoliosis or damage to the spinal structure.

Of course, when creating such a compensatory position, there cannot be just one fluid chamber on each side of the centre axis, but rather a number of fluid chambers that can be inflated or deflated to different degrees. This means that, depending on the body structure and shape of the seat user, increased sitting comfort can be achieved in the seat user's seat area by adjusting the compensatory position, for example by creating stronger padding in the area of the pelvic bones by inflating a fluid chamber in this area to a greater extent. The fluid chamber can also have different surface areas, so that certain areas of the user's buttocks are supported or not supported. This ensures that the seat adapts to the shape of the user's body.

Of course, it is also possible to inflate the fluid chambers arranged on one side or half of the seat part, while simultaneously emptying the fluid chambers in the other half, in order to achieve a correspondingly strong compensatory position in the lateral direction.

Alternatively, it is also conceivable that the volumes within the fluid chambers could be controlled using the control device and the valve devices in such a way that any amount of volume between a maximum and a minimum can be set within the fluid chambers. This means that different compensatory positions can be obtained in the lateral direction, which are adapted according to the degree of inclination of the vehicle and the vehicle seat.

In the simplest case, the left-hand and right-hand fluid chambers, or the left-hand and right-hand fluid chambers, are directly connected to each other, so that the fluid automatically escapes from one chamber in one half to the other chamber in the other half simply by shifting the body weight. This can even be done without the aid of a control device and a valve device. Even a tilt sensor is not necessary for this.

However, the desired effect of a compensatory position is very limited in this case. This type of compensatory position, namely by shifting body weight, can also be combined with a targeted additional supply or removal of fluid to/from the left-hand fluid chamber and/or the right-hand fluid chamber or to/from several fluid chambers on the left and/or right side. This is to be done with the help of the control device already mentioned, the inclination measurement signals of the inclination sensor device and the valve device.

The fluid chambers can be designed as air chambers, with a plurality of air chambers being arranged on the left and right sides of the centre axis. The medium air is advantageously usable for vehicle seats, since very many vehicle seats are equipped with an air suspension anyway and thus an air supply to the vehicle seat is already present. Such an air supply, for example by means of a pump device, can thus be used not only for the suspension of the vehicle seat, but also for the automatic adjustment of an inclination compensation of the seat part according to the invention.

According to a preferred embodiment, the fluid chambers do not extend over the entire seat surface of the seat part, but are limited in the sitting direction to the length of a pelvis of a seat user's buttocks area. This would mean, for example, that the front support surface for the seat user's legs is not covered by the fluid chambers. This is also not necessary, since the primary purpose is to support the pelvis.

In addition, this saves fluid or air volume. The advantage of this is that the degree of tilt compensation can also be changed quickly and automatically, for example if the tractor constantly changes its lateral alignment in its tilted position during a ploughing operation as it moves over the uneven ground. In this case, the larger the volume of the fluid chambers, the more fluid volume would have to be regulated within a very short time, which would reduce the reaction time of the vehicle seat according to the invention for automatic inclination compensation.

In addition, the extension of the fluid chambers in the transverse direction to the seat direction, i.e. in the width direction, can be limited to the width of an even middle area of the seat cushion, preferably up to the transitions to the side cheek areas. This even middle area is the main area that is stressed by the pelvis of the seat user, so that it would be sufficient to arrange fluid chambers in this area.

The control device is electrically connected to the valve device, whereby the valve device fills the fluid chambers with fluid, preferably with air, either in the first half on the left or in the second half on the right, in response to a signal from the control device, through an open position of a valve. This allows a counter-directional compensatory position and alignment of the seat surface, on which the seat user sits with his or her buttocks, to an externally caused tilted position of the vehicle to be obtained quickly.

In order to prevent the seat user from feeling the shape of the inflated fluid chambers, at least one felt layer is preferably arranged on the upper side and at least one felt layer is arranged on the underside of the fluid chambers, which extends over the entire surface area in which the fluid chambers are located. This would, for example, be the entire middle area of the seat part. This ensures that this felt layer smoothes out any differences in height that occur at the transition from a fluid chamber area to an area in which no fluid chamber is located. Alternatively or in addition to these felt layers, plastic layers can also be used.

The plastic layer or felt layer on the underside is primarily used to ensure that the fluid chambers are well supported in the actual foam area of the seat cushion part.

It must be emphasised that the entire structure of upper and lower felt layers, fluid chambers and a top cover fabric is located exclusively in the upper area of the cushion foam part or seat cushion part. This means that a large amount of foam material of the seat cushion part is still present below this multi-layered structure before the actual seat cushion part ends, viewed from top to bottom, and a substructure of the vehicle seat then begins.

A cover material layer is also preferably arranged on the top felt layer in order to protect the seat part and to give the seat part a visual design.

The control device has a time unit by means of which an automatic readjustment of the compensatory position of the seat part can be limited in time. In this way, for example, it can be ensured that the active inclination compensation is not used too often within a predefined period of time and/or is terminated after a period of time in order not to irritate the seat user by too frequent readjustments.

Such a limitation of the active inclination compensation to the field work or construction site work can also be achieved by activating the control device only at predetermined speed values and/or acceleration values of the vehicle. For example, an acceleration sensor unit can be used to evaluate whether the vehicle is currently travelling on a tarred road or in the field, i.e. on arable land. It is well known that lower accelerations of the vehicle occur during field use. Thus, the control device can be set by means of a CPU in such a way that inclination compensation only takes place at low acceleration values measured by the acceleration sensor unit.

But even when speed values are measured by means of a speed sensor unit, the control device can use the CPU to evaluate whether the vehicle is currently travelling at low speed in the field or on a construction site, or on a normal road journey. This can also be used to activate or deactivate inclination compensation.

Further advantageous embodiments can be seen in the drawing.

DETAILED DESCRIPTION

Figure 1:
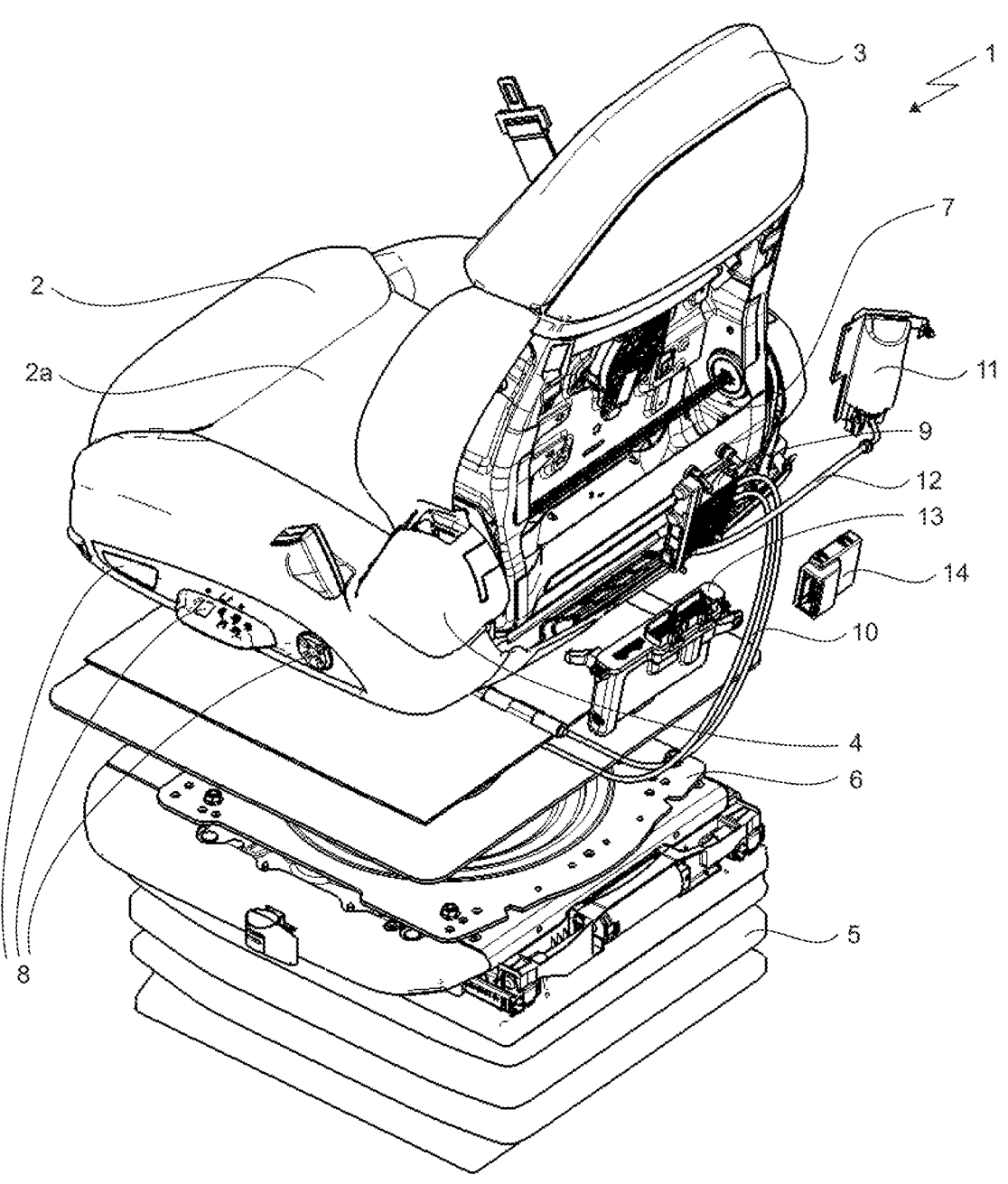
FIG. 1 in a perspective rear view as an exploded view, a vehicle seat according to the present invention.

FIG. 1 shows a vehicle seat 1 for compensating the inclination of the seat part in accordance with the present invention, in a perspective rear view and in an exploded view. The vehicle seat 1 has a seat part 2 with a seat part cushion 2*a*.

A backrest 3 is also provided. Indicated armrest areas 4 are connected to a pivot axis 7 in the backrest area in order to align them in a pivotable manner.

A bellows 5 surrounds the substructure of the vehicle seat, which usually has a scissor-type frame.

A turntable 6 is arranged between the seat part and the scissor-type frame in order to rotate the seat part together with the backrest in a horizontal direction.

Several actuating elements 8 are arranged on the side of the seat part and can be used to adjust the height, the degree of suspension and the like. In addition, these switches can be used to switch the function of the tilt compensation within the seat part, as described later, on or off.

A valve device 9 in the rear area is connected via fluid lines, usually air lines 10, to fluid chambers or air chambers below the seat part 2, which are not described in detail here, in order to inflate or deflate these air chambers in a targeted manner.

A fluid or air pump device 11 is used to supply the valve devices with air via line 12.

A control device 13 with a CPU is provided to control the valve devices and to receive measurement signals from an inclination sensor unit 14, which has the task of determining the current inclination of the vehicle and thus also of the vehicle seat and then sending inclination measurement data to the control device.

Figure 2:
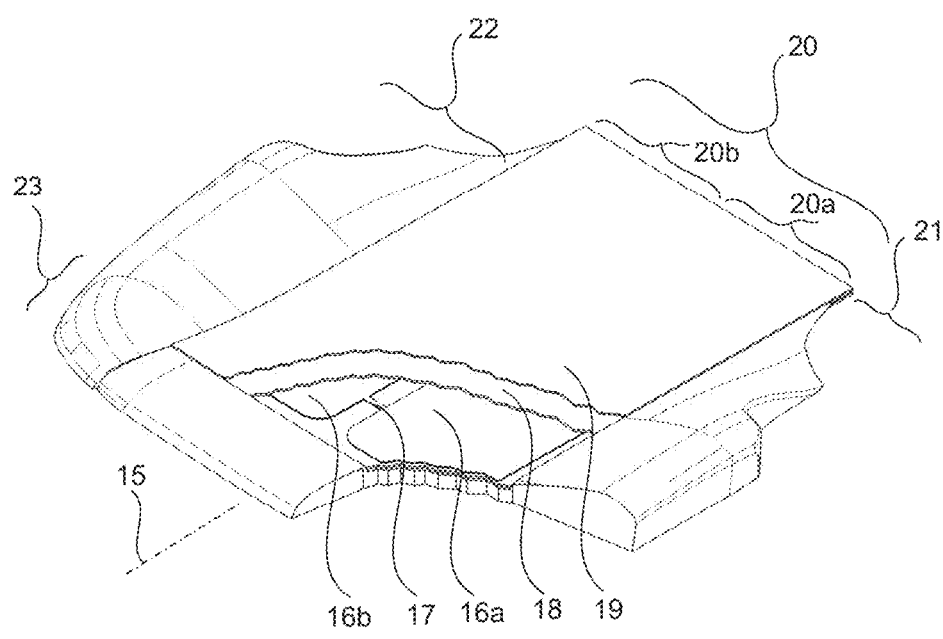
FIG. 2 in a perspective front view, parts of a seat part for inclination compensation according to the invention, according to one embodiment of the invention.

FIG. 2 shows a partial perspective view of a seat part according to a preferred embodiment of the invention. The seat part has a left-hand and a right-hand half. These left-hand and right-hand halves are separated by a notional centre line 15 running in the direction of travel.

Fluid chambers or air chambers 16*a* and 16*b* are arranged next to each other, with one air chamber 16*a* in the left-hand half and one air chamber 16*b* in the right-hand half, relative to the centre axis 15.

Both air chambers 16*a* and 16*b* can be connected to each other via connecting lines 17, but do not necessarily have to be connected.

The seat cushion has a central flat section 20, with the left half being designated 20*a* and the right half 20*b*. This central area 20 is bordered on the left and right sides by cheek areas 21 and 22, which, unlike the flat central area 20, rise up in height in order to provide lateral support for the seat user in the seat area.

A front leg area 23 of the seat part is not usually equipped with fluid chambers or air chambers, as this area is less relevant in terms of the position of the pelvis.

The air chambers arranged next to each other are covered by a felt layer 18 on the upper side, as shown in part, in order to achieve a surface-area balance in the height direction from one air chamber to the other. In addition, this felt layer is covered in the flat central area with a cover material or a cover fabric 19.

Figure 3:
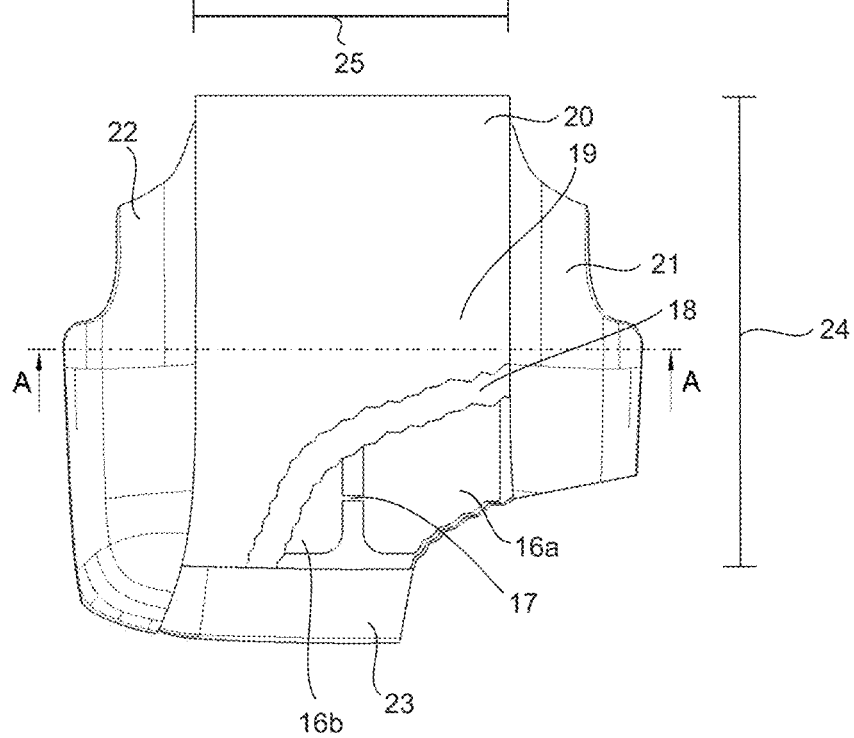
FIG. 3 in a plan view, parts of the seat part for inclination compensation according to the invention, according to one embodiment of the invention.

FIG. 3 shows a part of a seat part of the vehicle seat according to the invention in a cut-away form and in a plan view. It can be seen from this representation that the middle area has a width 25 which is limited by the beginning of the side cheek areas 22 and 21. In addition, the central area is characterised by a length 24 to make it clear that the air chambers 16*a*, 16*b* are arranged within this longitudinal distance 24 and the width distance 25.

Figure 4:
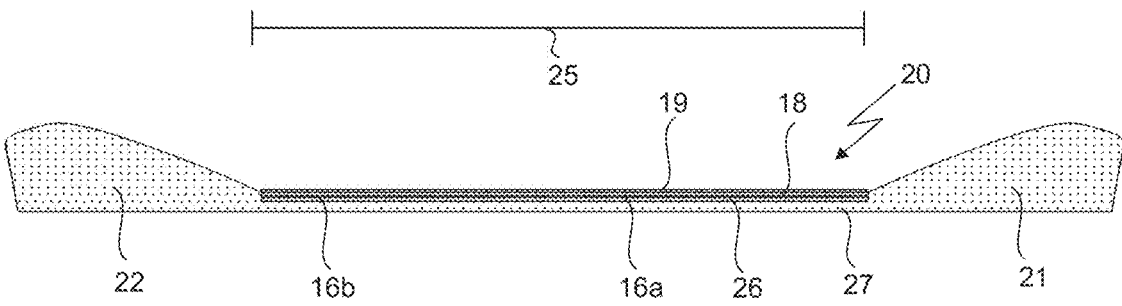
FIG. 4 in a cross-sectional view along A-A according to FIG. 3, the seat part with inclination compensation according to the invention.

Along a section A-A, as shown in FIG. 3, the associated cross-sectional representation is shown in FIG. 4. In addition, in FIG. 5, a right-hand enlarged section of the representation according to FIG. 4 is shown, viewed into the image plane.

Figure 5:
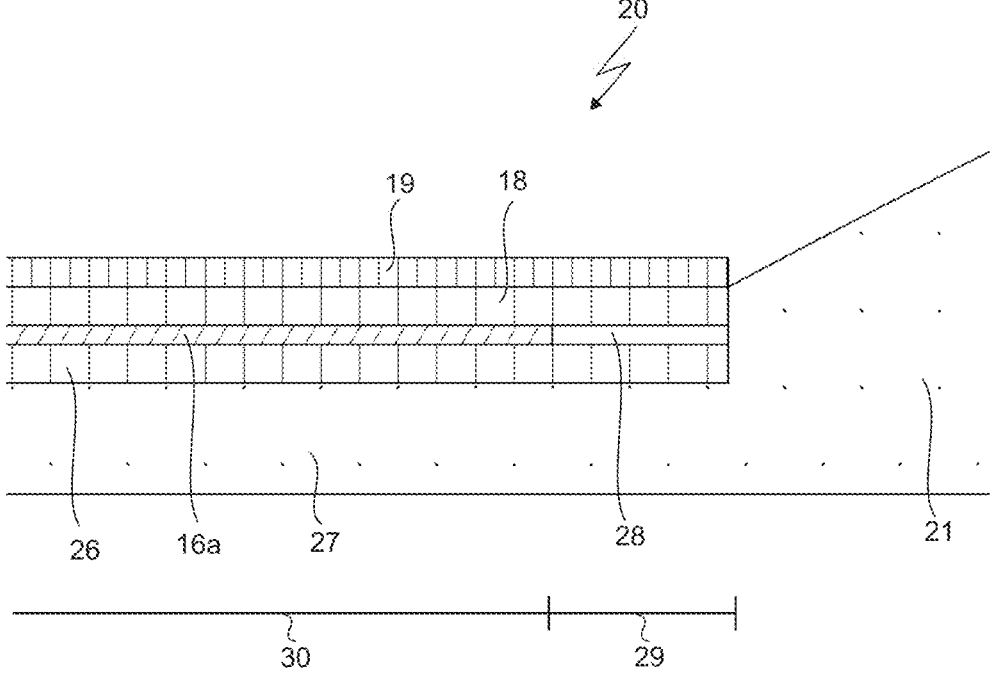
FIG. 5 in a sectional view, a right-hand area of the cross-sectional view shown in FIG. 4.

With reference to the representations in FIGS. 4 and 5, a layered structure in the upper seat area of the central flat area 20 is to be explained in accordance with the present invention. It is clear from these illustrations that a felt layer 18 and 26 are arranged above and below the air chambers 16*a* and 16*b*, with the upper felt layer 18 also being covered with the cover material 19.

The felt layer 26 on the underside also extends over the entire width of the central area of the seat part or the seat cushion part. Below this felt layer 26, a large part of the foam material 27 of the cushion foam part 2*a* can still be found. This is to emphasise that the layer structure consisting of layers 16*a*, 16*b*, 18, 19 and 26 is only arranged in the uppermost area of the seat part.

At the level of air chambers 16*a* and 16*b*, there may be 29 air-chamber-free areas 28 in the outer areas. Thus, the air chambers 16*a* and 16*b* have a width 30 that is less than the total width 25 of the flat central area.

Figure 6:
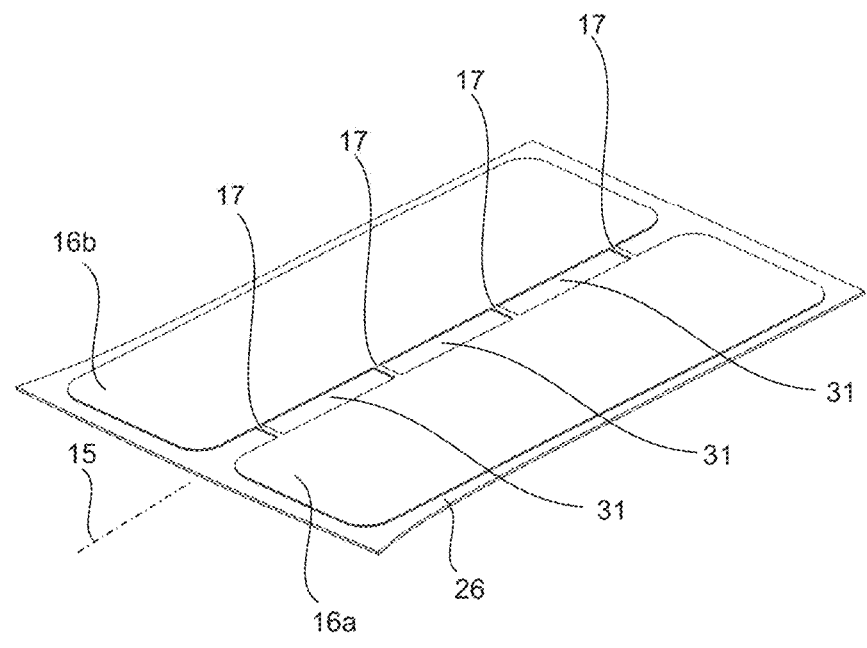
FIG. 6 in a perspective view, fluid chambers for a vehicle seat according to one embodiment of the invention.

FIG. 6 shows a section of the seat part with two air chambers 16*a* and 16*b* in a perspective view. This view clearly shows that one half of the air chambers, or one air chamber 16*a*, is arranged on one side of the centre axis 15 and the other 16*b* on the other side of the centre axis.

Both air chambers can be connected to each other by means of several connections 17. This alone can create a inclination compensation due to a shift in body weight and thus maintain a balanced position of the seat part and the seat surface. However, such a body shift alone is usually not sufficient. Middle webs 31 serve to space both fluid chambers from each other and to stabilise them in their position.

Figure 7:
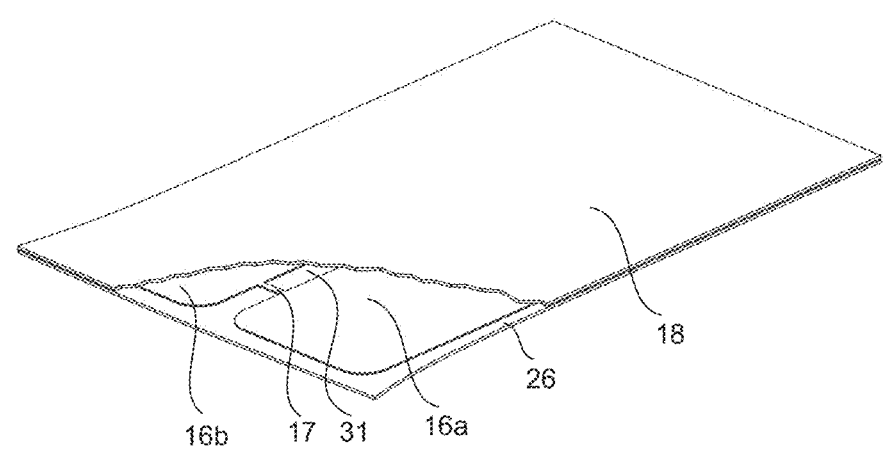
FIG. 7 the fluid chambers shown in FIG. 6 with a partial overlap.

FIG. 7 shows the air chamber depicted in FIG. 6, but with a felt layer 18 that covers some parts. This creates a uniform height compensation for the seat user who is sitting on the seat surface.

Figure 8:
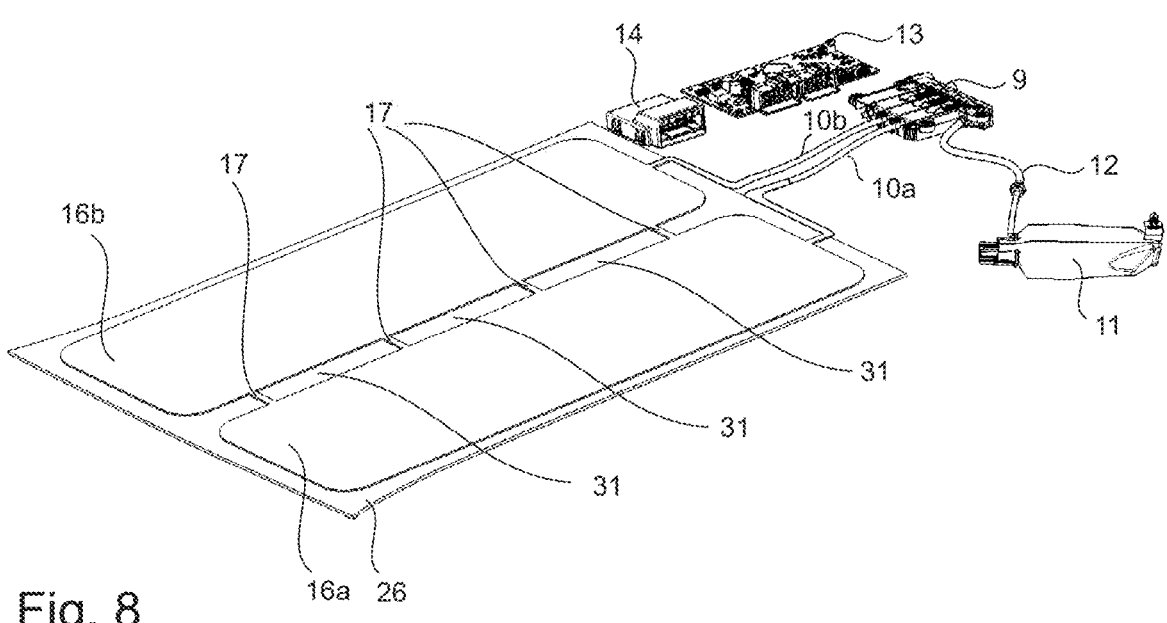
FIG. 8 in a perspective view, fluid chambers with devices connected thereto according to an embodiment of the invention.

FIG. 8 shows a perspective view of the left and right air chambers 16*a* and 16*b*, from which it can be seen that the air chambers can be supplied with air or emptied via the lines 10*a* and 10*b*, separated by a valve device 9. In this case, the intermediate connections 17 between the air chambers can either remain in place or be blocked or not even be present. This makes it possible to control the air chambers separately in an improved manner.

The inclination sensor unit 14, the control unit 13 and the pump unit 11, which is connected to the valve unit 9 by means of the line 12, are also shown. Existing connections between the control unit and the valve unit and the inclination sensor unit are not shown.

LIST OF REFERENCE SIGNS

1 Vehicle seat
2 Seat part
2*a* Seat cushion part
3 Swivelling axis
4 Armrest areas
5 Gaiter
6 Turntable
7 Swivelling axis
8 Actuating elements
9 Valve device
10 Air pipes
11 Fluid or air pump device
12 Pipe
13 Control device

7

14 Inclination sensor unit
15 Centre axis
16 Fluid chamber unit
16*a* Fluid chamber unit
16*b* Fluid chamber unit
17 Connecting pipes
18 Felt layer
19 Cover material layer
20 Even middle area
20*a* First half
20*b* Second half
21 Cheek area
22 Cheek area
23 Front leg area
24 Length
25 Width
26 Felt layer
27 Foam material
28 Air chamber-free areas
29 Width expansion
30 Expansion
31 Middle webs

What is claimed is:

1. A vehicle seat for automatic inclination compensation, comprising a seat part which has a seat cushion part,
    wherein a fluid chamber unit with at least two flexibly designed fluid chambers is arranged in the seat cushion part in an upper seat region,
    wherein, with reference to a center axis, a first half of the fluid chambers are arranged on a left-hand side and a second half of the fluid chambers are arranged on a right-hand side of the center axis,
    wherein the fluid chambers of the first and second halves can be filled or emptied by means of a control device in such a way that a seat user automatically experiences a compensatory position to an inclination position in the seat area, depending on a detected lateral inclination position of the seat part, and

wherein at least one chamber on the left-hand side is connected via at least one connecting line to at least one chamber on the right-hand side.

2. The vehicle seat according to claim 1, wherein an inclination sensor unit connected to the vehicle seat, which measures the degree of an instantaneous lateral inclination of the vehicle seat and/or of the vehicle and sends an inclination measurement signal to the control device.

3. The vehicle seat according to claim 1, wherein the fluid chambers are air chambers.

4. The vehicle seat according to claim 3, wherein a plurality of air chambers is arranged on each of the left-hand and right-hand sides of the center axis.

5. The vehicle seat according to claim 1, wherein the fluid chambers extend in a sitting direction limited to the length of a pelvis of a seat user's seat area.

6. The vehicle seat according to claim 1, wherein the fluid chambers extend transversely to a seat direction, limited to a width of an even middle area of the seat part, up to transitions into side cheek areas.

7. The vehicle seat according to claim 1, wherein the control device is connected to a valve device which, in response to a signal from the control device, fills the fluid chambers either with fluid, preferably air, in the first half on the left-hand side or in the second half on the right-hand side, through an open position of the valve device.

8. The vehicle seat according to claim 1, wherein the fluid chambers are covered on the top and bottom with at least one felt layer and/or one plastic layer in each case.

9. The vehicle seat according to claim 8, wherein the topside felt layer is covered with a cover material layer on which the seat user sits.

10. The vehicle seat according to claim 1, wherein the control device includes a time unit by means of which a time limit for a compensatory position of the seat part can be set.

11. The vehicle seat according to claim 1, wherein the control device can be activated at predetermined speed values and/or acceleration values of the vehicle.

* * * * *